(12) United States Patent
Gargett

(10) Patent No.: US 8,615,014 B2
(45) Date of Patent: Dec. 24, 2013

(54) SYSTEM AND METHOD FOR MULTIPLE CONCURRENT VIRTUAL NETWORKS

(75) Inventor: Charles Dunelm Gargett, Lathlain (AU)

(73) Assignee: iWebGate Technology Limited, Perth (AU)

( * ) Notice: Subject to any disclaimer, the term of this patent is extended or adjusted under 35 U.S.C. 154(b) by 70 days.

(21) Appl. No.: 13/039,027

(22) Filed: Mar. 2, 2011

(65) Prior Publication Data

US 2011/0216775 A1 Sep. 8, 2011

Related U.S. Application Data

(60) Provisional application No. 61/309,875, filed on Mar. 3, 2010.

(51) Int. Cl.
*H04L 12/28* (2006.01)

(52) U.S. Cl.
USPC .............. 370/395.53; 370/395.1; 370/395.54; 370/400; 370/401; 370/410

(58) Field of Classification Search
USPC .................. 370/395.5–395.54, 400, 409, 410
See application file for complete search history.

(56) References Cited

U.S. PATENT DOCUMENTS

| | | | |
|---|---|---|---|
| 7,010,716 B2 * | 3/2006 | Yu et al. ........................ 714/4.12 |
| 7,242,665 B2 * | 7/2007 | Langille et al. ................ 370/217 |
| 7,260,648 B2 * | 8/2007 | Tingley et al. ................. 709/245 |
| 7,389,358 B1 * | 6/2008 | Matthews et al. .............. 709/238 |
| 7,463,584 B2 * | 12/2008 | Allan et al. ..................... 370/234 |
| 7,715,381 B2 * | 5/2010 | Shen .............................. 370/389 |
| 8,073,966 B2 * | 12/2011 | Hannel et al. .................. 709/236 |
| 8,166,474 B1 * | 4/2012 | Delco et al. ..................... 718/1 |
| 2002/0067725 A1 * | 6/2002 | Oguchi et al. ................ 370/390 |
| 2003/0204618 A1 * | 10/2003 | Foster et al. .................. 709/238 |
| 2004/0095940 A1 * | 5/2004 | Yuan et al. ................ 370/395.53 |
| 2004/0120322 A1 * | 6/2004 | Wu ............................. 370/395.4 |
| 2006/0209836 A1 * | 9/2006 | Ke et al. ......................... 370/392 |
| 2007/0050525 A1 * | 3/2007 | Pao et al. ......................... 710/62 |
| 2007/0198656 A1 * | 8/2007 | Mazzaferri et al. ........... 709/218 |
| 2008/0107126 A1 * | 5/2008 | Oguchi .......................... 370/409 |

(Continued)

OTHER PUBLICATIONS

International Search Report of corresponding International Application No. PCT/AU2011/000247 dated May 5, 2011, total 2 pages.

(Continued)

*Primary Examiner* — Andrew Lai
*Assistant Examiner* — Andrew C Lee
(74) *Attorney, Agent, or Firm* — Novak Druce Connolly Bove + Quigg LLP

(57) ABSTRACT

Techniques are provided for establishment of multiple concurrent virtual networks. In one example, there is provided a method operable by a virtual network controller (VNC) or the like. The method may involve establishing communication links with a plurality of virtual network interfaces (VNIs) operatively coupled to a plurality of virtual networks. The method may involve establishing a single port communication link with an operating system. The method may involve allowing the virtual networks to be transported on top of a physical network, and facilitating communication between the operating system and the virtual networks via the single port communication link.

13 Claims, 6 Drawing Sheets

(56) References Cited

U.S. PATENT DOCUMENTS

| | | | |
|---|---|---|---|
| 2008/0259934 A1* | 10/2008 | Matthews et al. | 370/395.53 |
| 2009/0129385 A1* | 5/2009 | Wray et al. | 370/392 |
| 2009/0300605 A1* | 12/2009 | Edwards et al. | 718/1 |
| 2010/0054260 A1* | 3/2010 | Pandey et al. | 370/395.53 |
| 2010/0107162 A1* | 4/2010 | Edwards et al. | 718/1 |
| 2010/0131669 A1* | 5/2010 | Srinivas et al. | 709/233 |
| 2010/0290473 A1* | 11/2010 | Enduri et al. | 370/395.53 |
| 2011/0243032 A1* | 10/2011 | Jenne et al. | 370/254 |

OTHER PUBLICATIONS

Deri L. et al., "N2N: A Layer Two Peer-to-Peer VPN," Retrieved from the Internet: <URL http://luca.ntop.org/n2n.pdf>, published on Feb. 5, 2009 as per Wayback Engine, Section 3-5, Fig 1&2.

sourceforge.net, "Universal TUN/TAP driver—FAQ," Retrieved from the Internet: <URL http://vtun.sourceforge.net/tun/faq.html> published on Jan. 10, 2009 as per Wayback Engine, Whole document.

* cited by examiner

SYSTEM AND METHOD FOR MULTIPLE CONCURRENT VIRTUAL NETWORKS

CROSS-REFERENCE TO RELATED APPLICATIONS

This application claims the benefit of U.S. Provisional Application No. 61/309,875, entitled "System of Multiple Concurrent Virtual Networks," filed Mar. 3, 2010, which is hereby expressly incorporated in its entirety by reference herein.

BACKGROUND

1. Field

The present application relates generally to communication networks, and more particularly to computer-implemented techniques for layering virtual networks.

2. Background

The use of multiple physical network connections using multiple physical network interfaces as peripherals in a single computer is well known in the art. An advantage of such a system is that a computer user can be concurrently connected to multiple separate and discreet networks. This is particularly valuable in handling very large networks or in situations where high security is needed for each individual network but a computer user has clearance for access to more than one network at the same time.

The advent of virtual network connections has made it possible for private networks to "piggy back" on other often public networks and for the communications to be facilitated completely in software, thereby reducing costs and enabling rapid upgrade of network capability and deployment. The virtual network is accomplished by simulating with software the capabilities and function normally delivered by physical network devices.

Such virtual networks currently supply one virtual network connection at a time. In this context, it would be desirable to deliver the capabilities of a system using multiple physical network interfaces but doing so virtually as a software process.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for facilitating the establishment of multiple concurrent virtual networks. The method may be performed by a virtual network controller (VNC) or the like. For example, the method may involve establishing communication links with a plurality of virtual network interfaces (VNIs) operatively coupled to a plurality of virtual networks. The method may involve establishing a single port communication link with an operating system. The method may involve allowing the virtual networks to be transported on top of a physical network. The method may involve facilitating communication between the operating system and the virtual networks via the single port communication link.

In accordance with one or more embodiments and corresponding disclosure thereof, there is provided a system of multiple concurrent virtual networks. The system may include a plurality of virtual networks operatively coupled to a plurality of VNIs. The system may include a VNC in operative communication with the VNIs. The system may include an operating system operatively coupled with the VNC via a single port connection. The VNC may be configured to: allow the virtual networks to be transported on top of a physical network; and facilitate communication between the operating system and the virtual networks concurrently via the single port connection.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
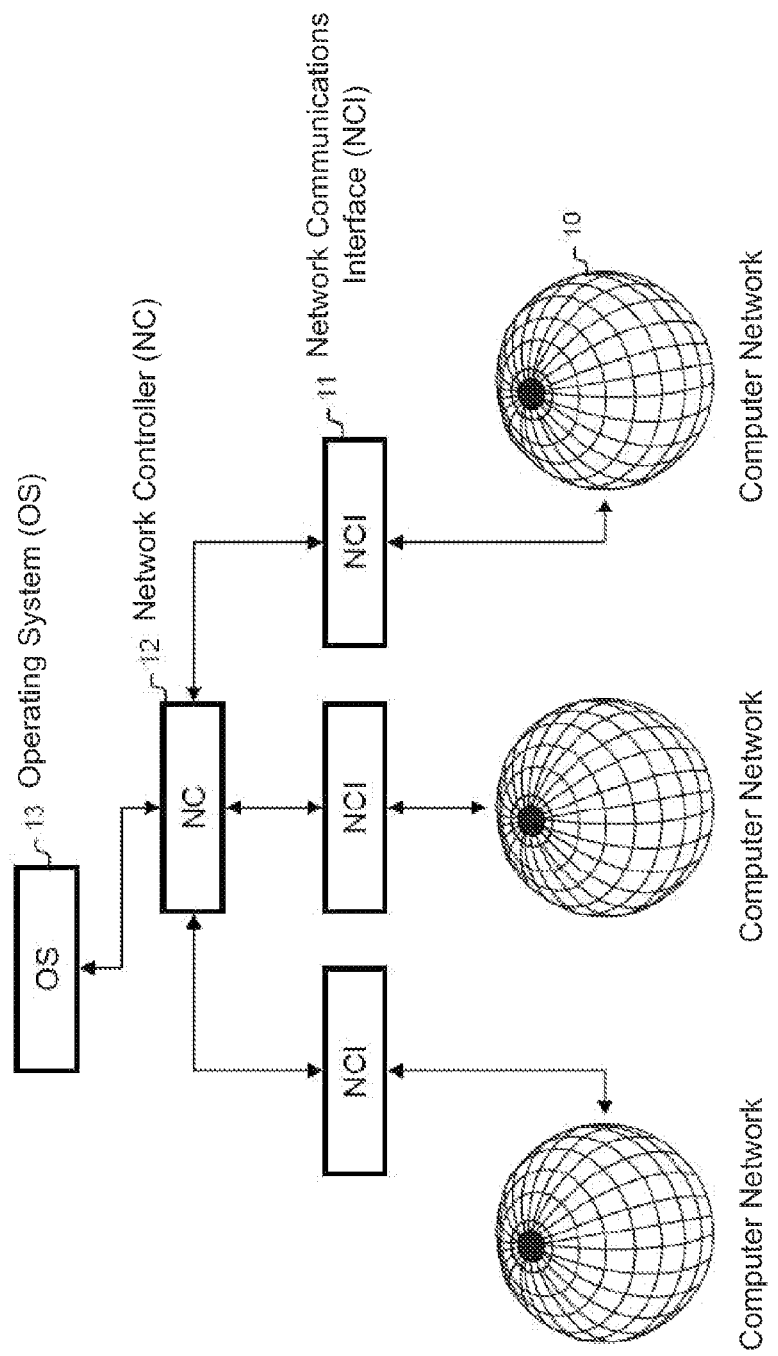
FIG. 1 shows a physical network connection system (Prior Art).

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments. The word "exemplary" is used herein to mean "serving as an example, instance, or illustration." Any embodiment described herein as "exemplary" is not necessarily to be construed as preferred or advantageous over other embodiments. The techniques described herein may be used for various communication networks, wired or wireless. The terms "network" and "system" are often used interchangeably.

With reference to FIG. 1, there is shown an overview of a physical network connection system on a single computer. Each computer network 10 is connected to a physical network communications interface 11 that is in turn connected to a network controller 12 that in turn delivers the communication data to the operating system 13 for processing and use by computer applications. The example in FIG. 1 also shows a multiple instance physical network connection that is known.

This configuration allows the computer user and applications to communicate and interact across multiple networks.

Figure 2:
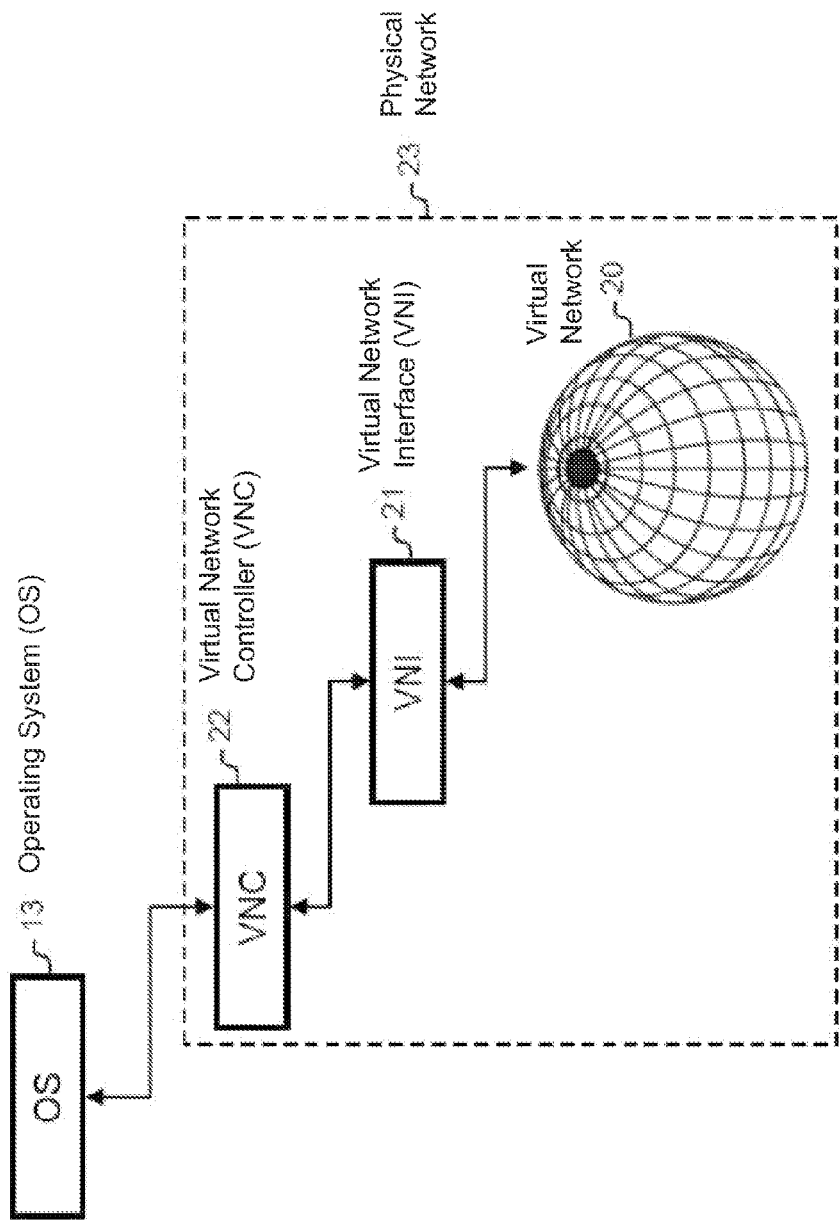
FIG. 2 shows a single instance virtual communications network (Prior Art).

With reference to FIG. 2, there is shown an example of a single instance virtual communications network that is known in the art. The virtual network 20 connects to a virtual network interface 21 that in turn connects to a virtual network controller 22 that then delivers the connection to the operating system 13. The advantage of this virtual network system is that the components are software based and can be transported on top of other physical networks such as the Internet 23.

Figure 3:
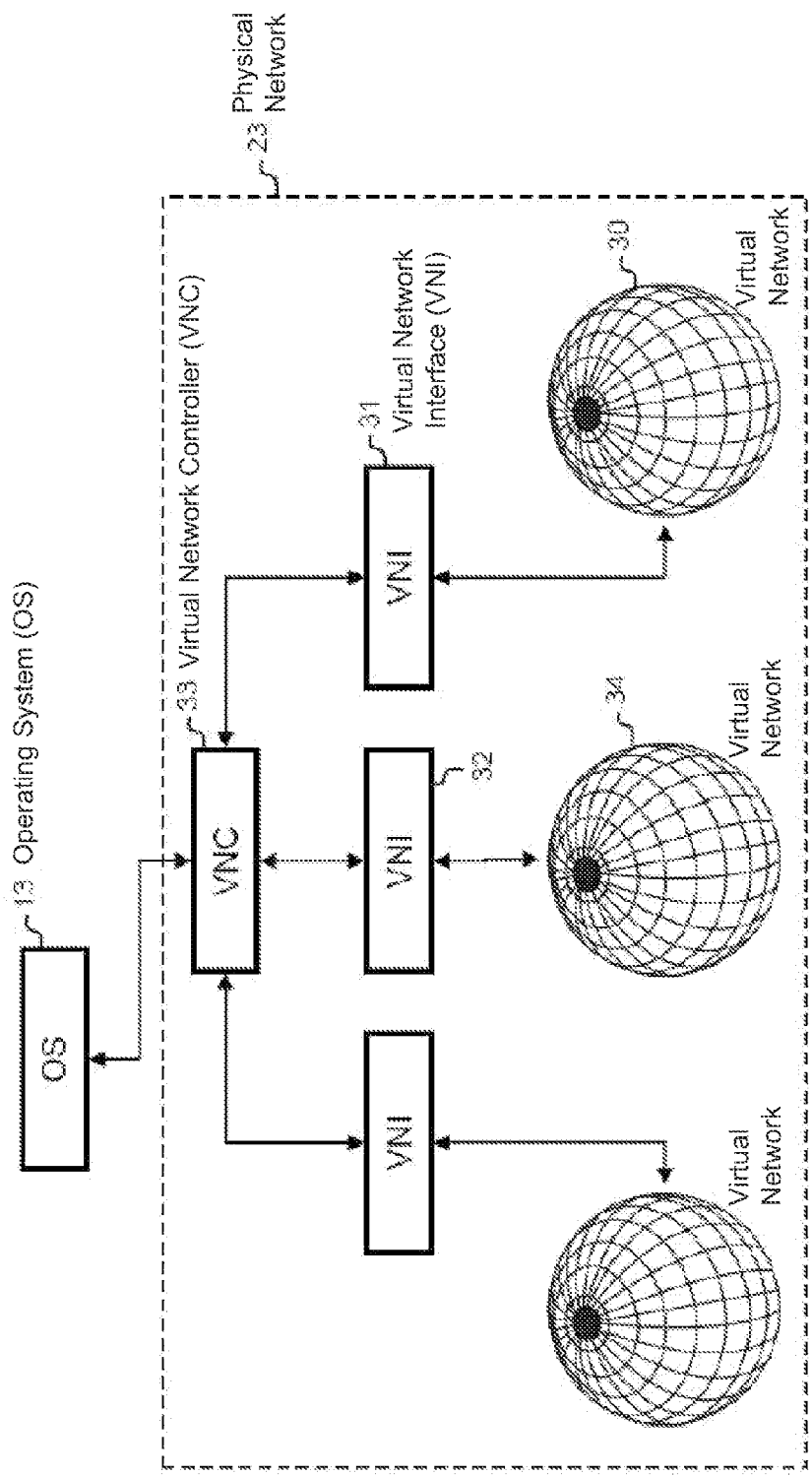
FIG. 3 shows an embodiment of a system of multiple concurrent virtual networks.

With reference to FIG. 3 there is provided an example embodiment of a system of multiple concurrent virtual networks. Similar to the system described in FIG. 2, the virtual network 30 is connected to a virtual network interface (VNI) 31 which is in turn connected to a virtual network controller (VNC) 33 that is in turn connected to the operating system 13. However the virtual network controller 33 is also capable of handling multiple concurrent network connections so that additional virtual networks 34 can be connected to additional VNIs 32 that are also connected to the VNC 33 and the operating system 13. This example embodiment allows multiple virtual networks 30, 34 to be used while they are transported on top of a physical network such as the Internet 23 in this case.

The embodiment of FIG. 3 only shows the inclusion of three simultaneous and separate network connections. However, in other embodiments, the system may support two or more connections. In related aspects, in an alternative embodiment, the system may include a virtual router between the VNC and the operating system to allow groups of virtual networks to connect to other groups of virtual networks.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
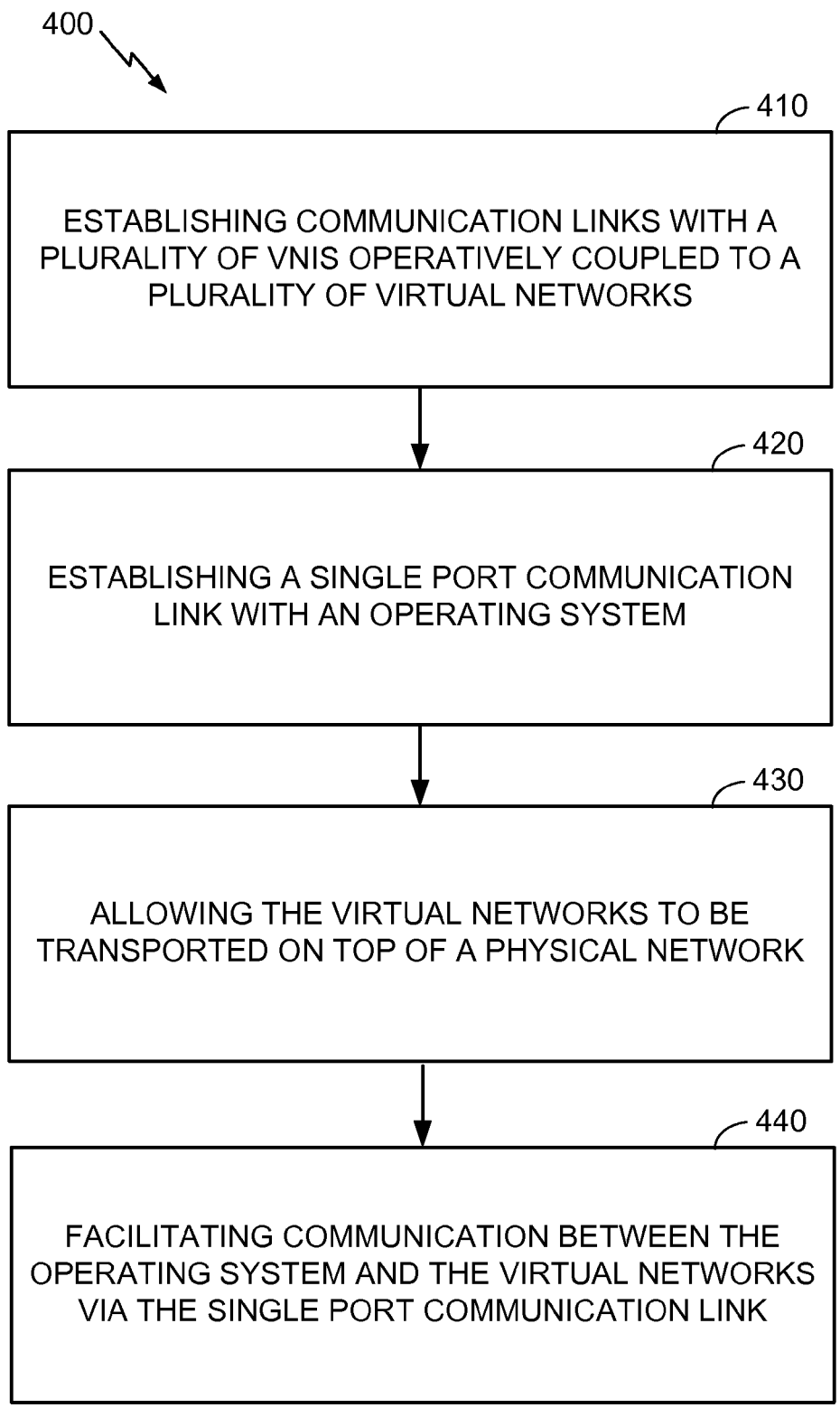
FIG. 4 illustrates an example methodology for establishing multiple concurrent virtual networks.

In accordance with one or more aspects of the subject of this disclosure, there are provided methods for establishing and using multiple concurrent virtual networks. With reference to FIG. 4, illustrated is a methodology 400 that may be performed by a virtual entity, such as, for example, a VNC or the like. The method 400 may involve, at 410, establishing communication links with a plurality of VNIs operatively coupled to a plurality of virtual networks. The method 400 may involve, at 420, establishing a single port communication link with an operating system. The method 400 may involve, at 430, allowing the virtual networks to be transported on top of a physical network. The method 400 may involve, at 440, facilitating communication between the operating system and the virtual networks via the single port communication link.

Figure 5:
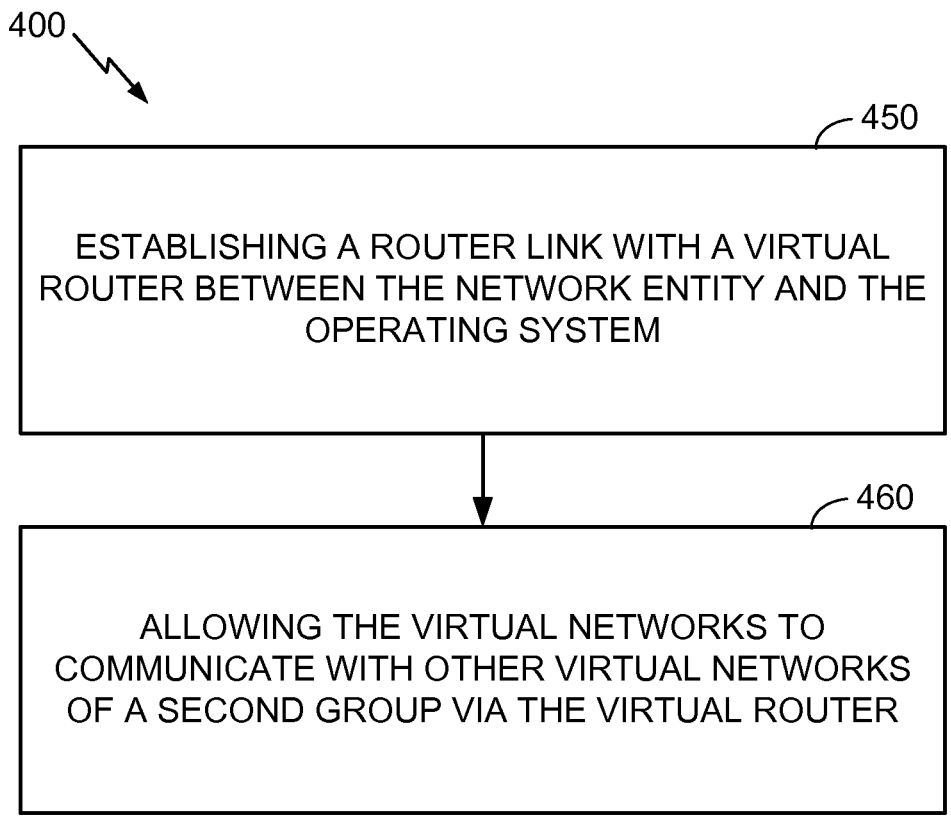
FIG. 5 illustrates further aspects of the methodology of FIG. 4.

With reference to FIG. 5, there are shown further operations or aspects of method 400 that are optional and may be performed by a VNC or the like. It is noted that the blocks shown in FIG. 5 are not required to perform the method 400. If the method 400 includes at least one block of FIG. 5, then the method 400 may terminate after the at least one block, without necessarily having to include any subsequent downstream block(s) that may be illustrated. It is further noted that numbers of the blocks do not imply a particular order in which the blocks may be performed according to the method 400.

With continued reference to FIG. 5, the physical network may include the Internet. In the alternative, or in addition, the physical network may include at least one wide area network (WAN). In related aspects, at least one of the virtual networks may include a virtual private network (VPN) that is tunneled through the physical network. In the alternative, or in addition, at least one of the virtual networks may comprise a virtual local area network (VLAN). In further related aspects, establishing the single port communication link may involve, at 450, establishing a router link with a virtual router between the network entity and the operating system. The method 400 may further involve, at 460, allowing the virtual networks to communicate with other virtual networks of a second group via the virtual router.

Figure 6:
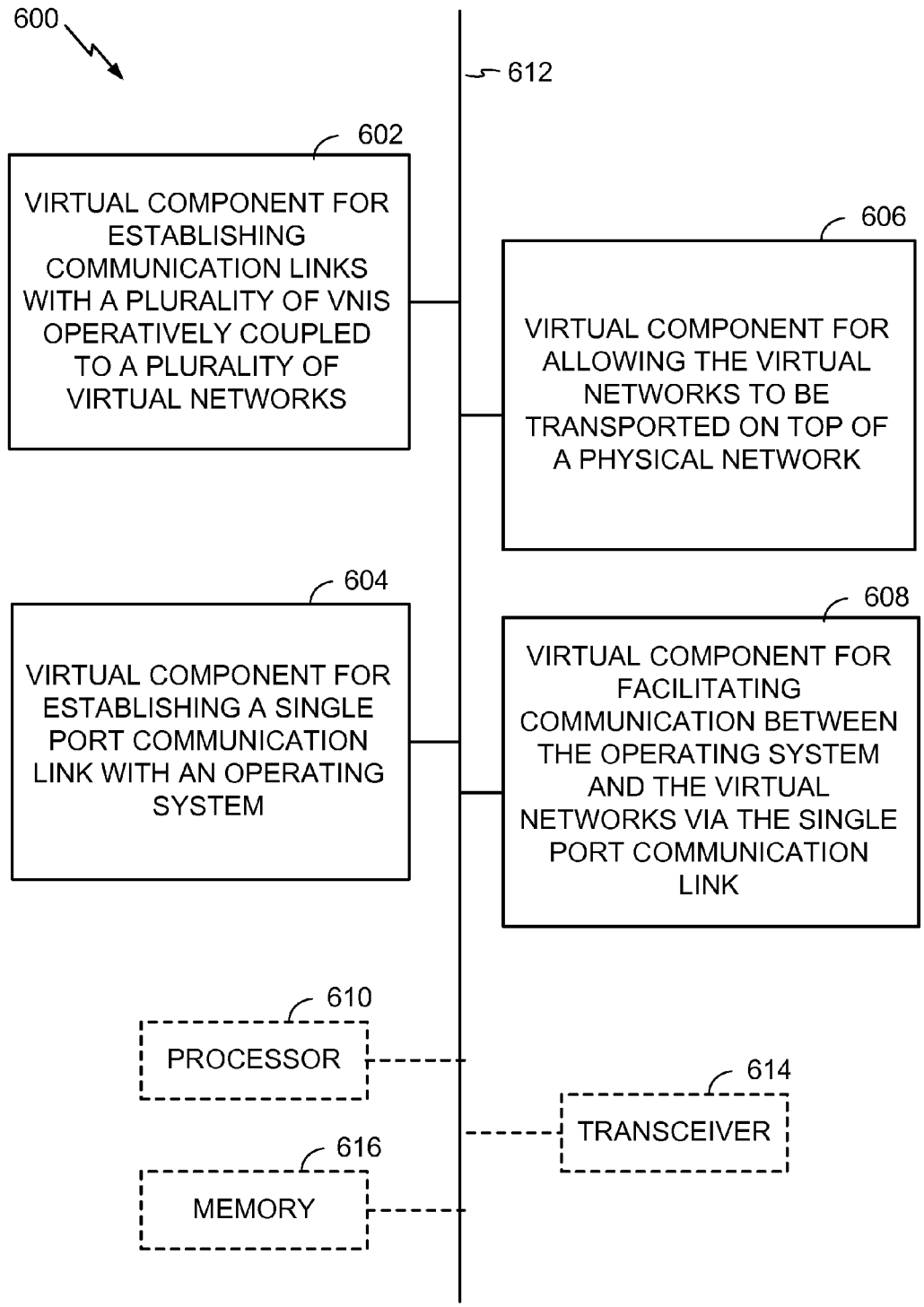
FIG. 6 shows an example virtual apparatus for establishing multiple concurrent virtual networks, in accordance with the methodology of FIGS. 4-5.

In accordance with one or more aspects of the embodiments described herein, there are provided devices and apparatuses for establishing and using multiple concurrent virtual networks, as described above with reference to FIGS. 4-5. With reference to FIG. 6, there is provided an exemplary apparatus 600 that may be configured as a device, or as a processor for use within the device. The apparatus 600 may include functional blocks that can represent functions implemented by a processor, software, or combination thereof (e.g., firmware).

For example, the apparatus 600 of FIG. 6 may comprise a virtual electrical component or module 602 for establishing communication links with a plurality of VNIs operatively coupled to a plurality of virtual networks. The apparatus 600 may comprise a virtual component 604 for establishing a single port communication link with an operating system. The apparatus 600 may comprise a virtual component 606 for allowing the virtual networks to be transported on top of a physical network. The apparatus 600 may comprise a virtual component 608 for facilitating communication between the operating system and the virtual networks via the single port communication link.

In related aspects, the apparatus 600 may optionally include a processor component 610 having at least one processor. The processor 610, in such case, may be in operative communication with the virtual components 602-608 via a bus 612 or similar communication coupling. The processor 610 may effect initiation and scheduling of the processes or functions performed by virtual components 602-608.

In further related aspects, the apparatus 600 may include a radio transceiver component 614. A stand alone receiver and/or stand alone transmitter may be used in lieu of or in conjunction with the transceiver 614. The apparatus 600 may optionally include a component for storing information, such as, for example, a memory device/component 616. The non-transitory computer readable medium or the memory component 616 may be operatively coupled to the virtual components of the apparatus 600 via a bus 612 or the like. The memory component 616 may be adapted to store computer readable instructions and data for effecting the processes and behavior of the virtual components 602-608, or the processor 610, or the methods disclosed herein. The memory component 616 may retain instructions for executing functions associated with the virtual components 602-608. While shown as being external to the processor 610, the transceiver 614, and the memory 616, it is to be understood that one or more of the virtual components 602-608 can exist within the processor 610, the transceiver 614, and/or the memory 616.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any non-transitory medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system, comprising:
    a virtual network controller (VNC) configured to establish a router link with a virtual router; and
    a plurality of virtual network interfaces (VNIs) of a plurality of virtual private networks (VPNs) in operative communication with the VNC, the VNC being directly coupled to an operating system;
    wherein the VNC is configured to:
    establish a single port communication link with the VPNs via a single port, the single port being coupled to the operating system;
    facilitate concurrent transport of the VPNs on top of a physical network; and
    facilitate communication between the operating system and the VPNs via the single port to achieve layering of the VPNs by software-implementation.

2. The system of claim 1, wherein the physical network comprises the Internet.

3. The system of claim 1, wherein the physical network comprises at least one of a wide area network (WAN), a local area network (LAN), or the Internet.

4. The system of claim 1, wherein at least one of the VPNs comprises a virtual local area network (VLAN).

5. The system of claim 1, wherein:
    The VPNs belong to a first group; and
    the virtual router allows the VPNs to communicate with other VPNs of a second group.

6. A software-implemented method operable by a virtual network controller (VNC) in a network system, comprising:
    establishing communication links between the VNC and a plurality of virtual network interfaces (VNIs) of a plurality of virtual private networks (VPNs), the VNC being directly coupled to an operating system;
    establishing a single port communication link with the VPNs via a single port, the single port being coupled to the operating system;

allowing the VPNs to be concurrently transported on top of a physical network; and facilitating communication between the operating system and the VPNs via the single port to achieve layering of the VPNs by software-implementation.

7. The method of claim 6, wherein the physical network comprises the Internet.

8. The method of claim 6, wherein the physical network comprises at least one wide area network (WAN).

9. The method of claim 6, wherein at least one of the VPNs comprises a virtual local area network (VLAN).

10. The method of claim 6, further comprising allowing the VPNs to communicate with other VPNs of a second group via a virtual router.

11. A computer program product, comprising:
a non-transitory computer-readable medium comprising code for causing a computer to:
establish communication links between a virtual network controller (VNC) and a plurality of virtual network interfaces (VNIs) of a plurality of virtual private networks (VPNs), the VNC being directly coupled to an operating system;
establish a single port communication link with the VPNs via a single port, the single port being coupled to the operating system;
allow the VPNs to be concurrently transported on top of a physical network; and
facilitate communication between the operating system and the VPNs via the single port to achieve layering of the VPNs by software-implementation.

12. The computer program product of claim 11, wherein at least one of the VPNs comprises a virtual local area network (VLAN).

13. The computer program product of claim 11, wherein the non-transitory computer-readable medium further comprises code for causing the computer to allow the VPNs to communicate with other VPNs of a second group via a virtual router.

* * * * *